United States Patent [19]

Chisholm et al.

[11] Patent Number: 5,205,674
[45] Date of Patent: Apr. 27, 1993

[54] SOIL DECONTAMINATION METHOD

[75] Inventors: Charles C. Chisholm, 1455 Washington Ct., Reno, Nev. 89507; Eugene J Botts, Reno, Nev.

[73] Assignee: Charles C. Chisholm, Reno, Nev.

[21] Appl. No.: 823,036

[22] Filed: Jan. 13, 1992

Related U.S. Application Data

[63] Continuation of Ser. No. 568,310, Aug. 16, 1990, abandoned.

[51] Int. Cl.$^5$ .............................................. F23G 7/14
[52] U.S. Cl. .................................. 405/258; 405/128; 110/348
[58] Field of Search ...................... 405/128, 129, 258; 241/DIG. 10; 110/220, 235, 236, 240, 241, 346; 210/771; 34/136, 137; 432/105, 108, 110, 111, 118; 209/284, 297

[56] References Cited

U.S. PATENT DOCUMENTS

| | | | |
|---|---|---|---|
| 4,715,965 | 12/1987 | Sigerson et al. | 110/346 X |
| 4,748,921 | 6/1988 | Mendenhall | 110/346 |
| 4,750,436 | 6/1988 | Maury et al. | 110/346 |
| 4,751,887 | 6/1988 | Terry et al. | 110/246 |
| 4,815,398 | 3/1989 | Keating et al. | 110/346 X |
| 4,895,085 | 1/1990 | Chips | 110/346 |
| 4,969,775 | 11/1990 | Cappel et al. | 405/128 |

OTHER PUBLICATIONS

Flyer entitled "Remediation of Petroleum-Contaminated Soil.", TPS Technologies Inc., available prior to Aug. 16, 1990.
Flyer entitled "Fire for Petroleum-Contaminated Soil", TPS Technologies Inc., Available prior to Aug. 16, 1990.
Flyer entitled "Transportable Treatment Unit for Decontaminating Soils Containing Hydrocarbons", U.S. Waste Thermal Processing, available prior to Aug. 16, 1990.
Flyer to Site Reclamations Systems, Inc., available prior to Aug. 16, 1990.

Primary Examiner—Randolph A. Reese
Assistant Examiner—John Ricci
Attorney, Agent, or Firm—Townsend and Townsend Khourie and Crew

[57] ABSTRACT

A soil decontamination method in which soil and rocks contaminated with hydrocarbons, but substantially free of hazardous materials, is processed at a stationary site. The soil is first stored in a lined storage pit, segregated by type and source. Rock and extraneous material, such as concrete, asphalt, plastic, metal and debris (such as wood, sticks and paper) are removed from the soil and segregated. The soil is first heated to about 260° C. to 425° C. to desorb, but not burn, any hydrocarbon from the soil. The cleaned soil and hydrocarbon-containing heating gas then pass into a separator which separates the heavier soil components from the heating gas and the fines. The heating gas and fines are then heated to a much higher temperature, such as 760° C. to 900° C., to combust the hydrocarbon to create combusted gas and fines. The combusted gas and fines pass are cooled and the fines are filtered out. The fines and heavier soil components are remixed to obtain cleaned soil while the combusted gas is exhausted into the atmosphere. The rocks are washed for reuse. Large rocks can be washed by spraying while small rocks can be cleaned using a tumbling washer. The dirty washing liquid is recycled. Concrete and asphalt can be crushed and recycled while plastic and metal can be shredded and recycled.

17 Claims, 1 Drawing Sheet

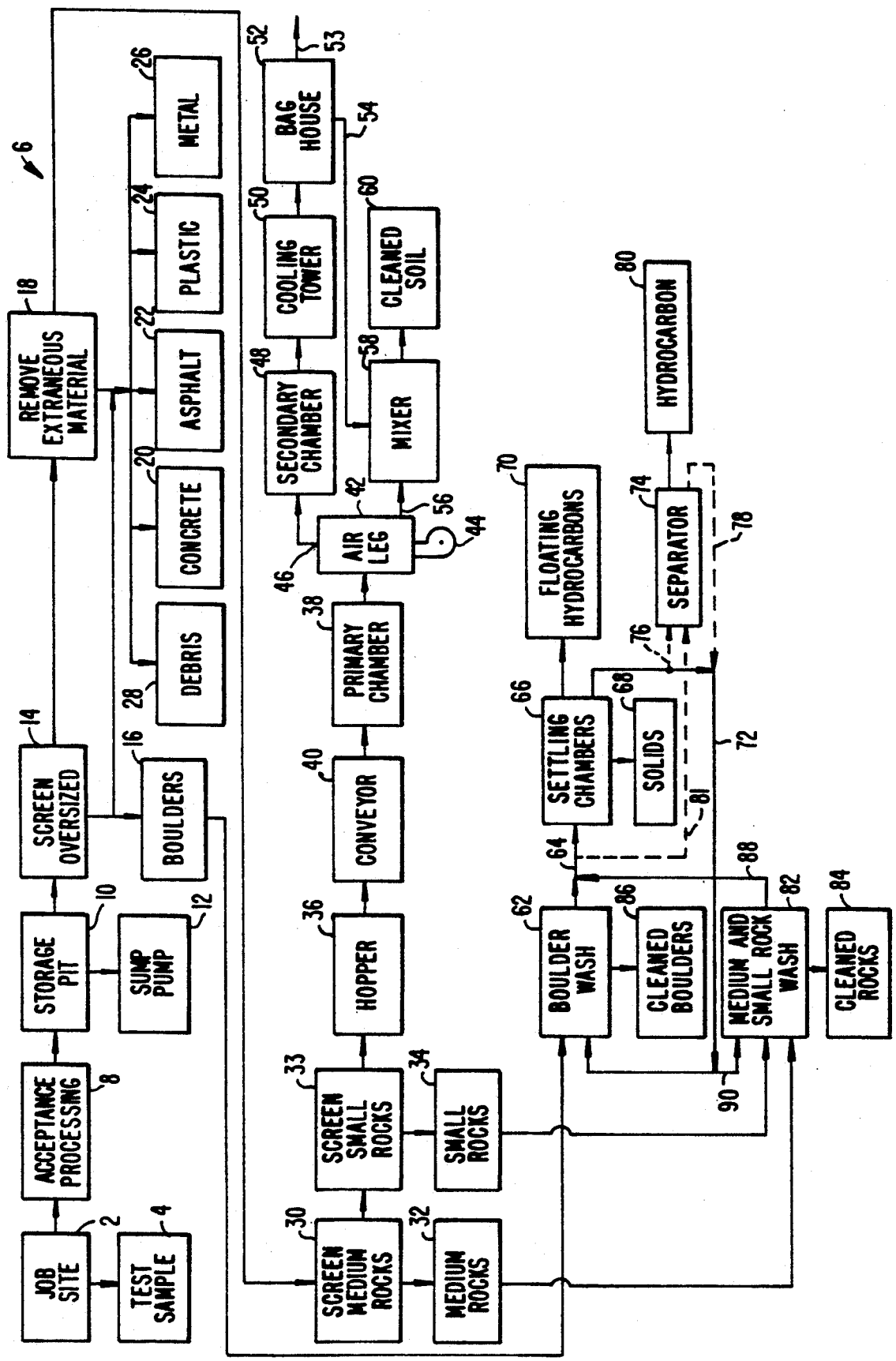

SOIL DECONTAMINATION METHOD

This is a continuation of application Ser. No. 07/568,310, filed Aug. 16, 1990, now abandoned.

BACKGROUND OF THE INVENTION

Cleaning soil contaminated with industrial chemicals, agricultural chemicals, oil and motor vehicle fuels has been recognized as a critical problem. Soils are often contaminated with hydrocarbons (such as oil and fuels), from slowly leaking storage tanks or from unintentional spills. Soils contaminated with lower molecular weight hydrocarbons have been treated by combusting the soil to remove the hydrocarbons to permit the cleaned soil to be re-used.

Other contamination is from hazardous materials, such as chlorine and more complex, higher molecular weight hydrocarbons, typically those above C30. The hazardous materials must often be incinerated at higher temperatures to break them down. However, the higher temperatures and the nature of the materials often create by-products which are themselves hazardous, so that combusting hazardous materials must be done very carefully. Generally, such systems designed for combusting hazardous materials include specialized exhaust gas scrubbers to remove any hazardous products of combustion.

One common way to treat contaminated soil is through the use of mobile systems, such as that used by Site Reclamation Systems, Inc. of Howey In The Hills, FL, Aztec Industries of Chattanuga, TN and General Combustion Company of Orlando, FL. One of the problems with mobile systems is that they make no provision for cleaning extraneous material in the soil. Often the rocks and other extraneous material are simply dumped back into the hole without treatment. The alternative is to truck the rocks and other extraneous material to a landfill. Thus, although the present mobile soil decontamination systems can and do help clean hydrocarbons from contaminated soils, they are necessarily limited in the range of materials which they can accommodate.

SUMMARY OF THE INVENTION

The present invention is directed to a stationary soil decontamination system which permits the decontamination of both the soil and the rocks of a hydrocarbon-contaminated soil mixture so that the complete soil mixture is properly dealt with.

The soil decontamination system is used with soil contaminated with hydrocarbons, but which is substantially free of hazardous materials. Hazardous materials are those which, if incinerated at between about 760° C. and 900° C., either do not break down or create other hazardous materials. Hydrocarbons below about a C30 carbon count are generally considered not to be hazardous. The method decontaminates not only soil but rocks as well at a stationary site.

The soil mixture to be decontaminated is first checked to determine the type of contaminate. As long as the type of contaminant does not include higher order hydrocarbons, typically C30 and above, and other hazardous materials such as chlorine, the soil mixture is accepted and emptied into a lined storage pit. The contents of the storage pit can be segregated by the generator of the contaminated soil mixture. The soil mixture is then removed from the storage pit for processing.

Processing preferably includes first screening for oversized material, such as boulders and other large extraneous material. The soil mixture, minus the oversized, then moves along a conveyor at which additional extraneous material, such as concrete, asphalt, plastic, metal and debris (such as wood, sticks, glass bottles and paper) are removed and segregated. The soil mixture then is screened to remove medium-sized rocks and then again screened to remove small rocks so that substantially all extraneous material has been removed from the soil mixture to leave only soil. The soil then proceeds to thermal treatment.

In thermal treatment the soil preferably goes into a hopper, passes along a conveyor and into a primary heating chamber. The soil is heated in the primary chamber to desorb any hydrocarbon from the soil driving the hydrocarbon into the heating gas in the primary chamber. This occurs at a relatively low temperature of about 260° C. to about 425° C. The cleaned soil and the hydrocarbon-containing heating gas then pass into an air leg separator, which separates the heavier soil components from the heating gas and the fines soil component. The heating gas and fines are then passed into a secondary heating chamber, heated to a much higher temperature, such as 815° C., to combust the hydrocarbon to create combusted gas and fines. The combusted gas and fines pass through a cooling tower, to reduce the temperature of the mixture, and then into a bag house which separates the fines from the combusted gas. The fines from the bag house are mixed with the heavier soil components from the air leg separator to obtain cleaned soil while the combusted gas is exhausted into the atmosphere.

The rocks removed from the soil mixture are preferably cleaned for reuse. Larger rocks, such as boulders, can be washed by spraying while smaller rocks can be cleaned using a tumbling washer. Preferably, the dirty washing liquid is passed through a settling tank through a series of chambers to remove solids and floating hydrocarbons from the wash water so that the wash water can be recycled. If necessary, a hydrocarbon separator can be used to further remove hydrocarbons from the wash water prior to reusing the wash water.

Various types of apparatus can be used for washing the rocks. For example, trommel partially filled with wash water can be used to wash the smaller rocks. Also, a large plate feeder, usually used to feed ore into a jaw crusher, could be used to wash the rocks. Large rocks can be sprayed manually or in an automatic sprayer apparatus. Preferably, the concrete, asphalt, plastic and metal is separated and recycled. The concrete and asphalt is usually pulverized or crushed for use in roadbeds and so forth. Although not usually necessary, any of these extraneous materials may be cleaned, such as by washing, prior to being recycled.

The rock is preferably washed before being reused. However, in some cases the rock may be relatively clean; in such cases the rock could be used as is, or crushed into gravel for reuse without being washed.

One of the primary advantages of the invention results from its stationary nature. This permits the use of the storage pit for the safe containment of contaminated soils. The contaminated soil from the various generators can be easily segregated so that loads of soil having a particular type of contaminant, or group of contaminants, can be stored together for more efficient processing in the future.

Another feature of the invention is the use of the relatively low temperature for the thermal desorbtion at the primary chamber. This is important because it not only reduces the energy required to remove the hydrocarbons, but also reduces the processing cost.

By combining two methods of treatment, that is thermal and washing, the most advantageous method can be used for the particular soil component.

A further advantage of the invention results from the placement of the bag house to collect the fines after the secondary chamber. Conventionally, the bag house is placed before the secondary (afterburner) chamber. However, it has been found that the cooling which occurs in the bag house can cause the desorbed hydrocarbons to condense onto the filter material and onto the fines collected at the bag house so that the filter and fines become contaminated. With the present invention, the tendency for hydrocarbons to collect or condense in the bag house is substantially eliminated so to enhance the cleaning effectiveness.

Other features and advantages of the invention will appear from the following description in which the preferred embodiment has been set forth in detail in conjunction with the accompanying drawing.

BRIEF DESCRIPTION OF THE DRAWING

The figure is a schematic flow diagram showing the soil decontamination method according to the invention.

DESCRIPTION OF THE PREFERRED EMBODIMENT

The present invention is directed to a method for decontaminating earth which has been contaminated with hydrocarbons, particularly those which do not constitute hazardous materials. This application considers low molecular weight hydrocarbons, especially those above about C30 (30 carbon atoms), as well as other hazardous waste materials, to be hazardous contaminants. Other materials which may or may not be hazardous as they exist in the soil create hazardous compounds when heated. These materials, such as chlorine, are also considered hazardous materials. The invention is thus primarily useful for decontaminating soil which has been contaminated with oil, petroleum-based fuels and similar low molecular weight hydrocarbons.

Broadly, the preferred method includes the following steps: pre-test the contaminated earth for hazardous contaminants, accept the earth if it passes the pre-test, temporarily store the contaminated earth, process the contaminated earth (e.g., separate extraneous material from the soil), treat the contaminated earth (e.g., thermal and washing) and recycle the end products for beneficial use (e.g., cleaned soil, cleaned rock, metal, etc.). The basic concept is waste reduction through treatment of contaminating earth.

The contaminated earth is removed at job site 2. The soil mixture includes soil, rock, and, typically, extraneous materials such as concrete, asphalt, plastic, metal and debris, typically wood and glass. A test sample 4 is made of the contaminated soil mixture to determine the particular contaminant(s). If test sample 4 indicates anything more than an insignificant amount of a hazardous waste, the contaminated earth is not accepted for processing. Assuming the test sample meets the criterion for processing in system 6, that is, hydrocarbon contaminants less than about C30 and no other hazardous wastes, the material is trucked or otherwise transported to the processing site for acceptance processing 8. At acceptance processing 8, further testing of the soil mixture is done to determine the classification of contaminants, soil type, and, especially, the presence of chlorine. (The presence of chlorine will cause the soil mixture not to be accepted because of the hazardous products which can be produced when the chlorine is heated.)

The source of the soil mixture, called the generator, is given a code to track the soil mixture for that generator after it is dumped into the storage pit 10. Storage pit 10 is provided with a dumping ramp so that the vehicles bringing the soil mixtures from the generators do not drive through the contaminated soil once it has been dumped. Soil mixtures from the various generators are stored in the storage pit 10 according to the soil type, type of contaminants, and so forth. The location of the soil from particular generators are recorded in a three-dimensional form and are physically staked out in the pit 10. This permits the operator of system 6 to process batches of like soil mixtures.

Storage pit 10 is preferably a double-lined pit having a low area from which a sump pump 12 can remove contaminated rain water. Generally, the contaminated soil in soil pit 10 need not be covered because after a short period of time the outer surface, if undisturbed, acts as a barrier to the escape of contaminants into the air from the soil. However, in some cases, such as when contaminated with highly volatile hydrocarbons, it may be desired to cover the soil mixture held in storage pit 10. Storage pit 10 is designed to minimize the volatilization of hydrocarbon contaminants in the soil mixture. Storage pit 10 could be sized to best accommodate the amount of the soil mixture to be stored. Other environmentally safe soil storage structures, including enclosed structure, could be used as well.

Next, the soil mixture is processed to separate the components of the soil mixture. Initially, soil mixture is dumped onto a screen which separates out oversized material at 14. At this step, boulders 16 are separated from other oversized extraneous material. The soil mixture, minus the boulders and oversized extraneous material, then passes onto a conveyor 18, at which other extraneous material is removed by workers stationed along the conveyor (this step could be automated as well). The other extraneous material, typically concrete 20, asphalt 22, plastic 24, metal 26 and debris 28, usually wood and glass, is collected and stored with the oversized extraneous material of the same type. The remaining soil mixture then passes through a medium rock screen 30 at which medium rocks 32 are removed. Small rocks 34 are removed at small rock screen 33. What remains of soil mixture is now essentially soil.

The soil may be temporarily stored (not shown in FIG. 1) or passed directly into a hopper 36 to start the thermal treatment. Hopper 36 passes the soil to a primary chamber 38 by conveyer 40. Primary chamber 38 is used to heat the soil to about 260° C. to 425° C. so that the hydrocarbon desorbs from the soil but does not burn. The desorbed hydrocarbon, the heating gas from primary chamber 38 and the soil is passed into an air leg separator 42 which includes a blower 44 creating an updraft in air leg separator 42. This causes the heating gas and the fines from the soil to exit the top 46 of separator 42 and pass into a secondary chamber 48.

The hydrocarbons in secondary chamber 48 are combusted by heating in the secondary chamber to about 815° C. The products of combustion and fines exit secondary chamber 48 and pass into a cooling tower 50 to cool the materials. The materials then exit the cooling tower and enter a baghouse 52 which filters out the fines from the products of combustion. The products of combustion and the fines exit bag house 52 at 53 and 54 respectively. The fines and the heavier material, which exits the lower portion of air leg separator 42 at 56, preferably using an auger type of material transporter, are combined at a mixer 58 to create clean soil 60. Hopper 36, conveyor 40, primary chamber 38, air leg 42, secondary chamber 48, cooling tower 50 and bag house 52 are all generally conventional in structure, such as those made by Aztec Industries of Chattanooga, Tennessee and General Combustion Company of Orlando, FL.

It should be noted that by providing baghouse 52 after secondary chamber 48, rather than vice versa, hydrocarbon components which have been desorbed at primary chamber 38 cannot condense onto the fines or the filter in the baghouse. This results in more complete combustion of the desorbed hydrocarbons to help eliminate recontamination of the fines.

System 2 also provides for Washing of boulders 16 and rocks 32, 34. Boulders 16 are washed at a boulder wash station 62. This is preferably accomplished by simply spraying the boulders and other large rocks either manually or automatically. The dirty wash water passes from boulder wash station 62 along a line 64 to a series of settling chambers 66. Settling chambers 66 permit solids 68 to settle out and be removed. Settling chambers 66 also permit floating hydrocarbons 70 to be skimmed from the surface after a proper retention time based upon the volume of wash water. Recycled wash water can then be returned to boulder wash 62 along line 72. If, however, the wash water needs to be further cleaned, wash water can be diverted to a separator 74 as indicated by dashed lines 76, 78. Separator 74 may be a conventional type, such as a centrifugal separator, to separate hydrocarbon 80 from the recycled wash water. If desired, the dirty wash water can bypass settling chambers 66 and be directed directly to separator 74 along a line 81.

Medium and small rocks 32, 34 are washed at a medium and small rock wash station 82. Wash station 2, in the preferred embodiment, uses a trommel partially filled with wash water to tumble and wash the rocks. The rocks are also sprayed with high pressure wash water in the trommel. The cleaned rocks 84 are removed from the trommel after being washed, just as the clean boulders 86 are removed from the boulder wash station 62 after they are washed. The wash water used at station 62 is processed in the said manner as from boulder wash station 62 using lines 88, 90 which connect to lines 64 and 72, respectively. Generally, medium rocks 32 and small rocks 34 are washed separately, rather than together, because it is usually desired to keep them separate. This is especially true when contaminated with longer chain hydrocarbons.

At the end of processing, the rocks and soil are cleaned and ready for reuse. Concrete 20 and asphalt 22 are often crushed and used without further cleaning. They could, however, be cleaned as well. Plastic 24 and metal 26 can be recycled while debris 28 is generally disposed of at a landfill.

System 6, being stationary, permits much more flexibility and a much greater degree of cleaning and decontamination than is possible with mobile systems. Use of storage pit 10 permits the safe storage and segregation of different types of contaminated soil for later processing in an effective and efficient manner. The storage pit's main purpose is to provide environmentally safe storage of the contaminated soil prior to processing.

Modification and variation can be made to the disclosed embodiment without departing from the subject of the invention as defined in the following claims.

What is claimed is

1. A method for decontaminating a soil mixture contaminated with a hydrocarbon, the soil mixture including soil, rock and, optionally, extraneous material, comprising the following steps:
   checking the soil mixture for the type of contaminant;
   separating substantially all of the rock and extraneous material from the soil in the soil mixture;
   separating the rock from said any extraneous material;
   washing the rock with a washing liquid; and
   heating the separated soil in a heating gas at a temperature sufficient to combust the hydrocarbon in the soil to get cleaned soil.

2. The method of claim 1 further comprising the step of segregating the separated rock into groups of rocks according to size.

3. The method of claim 2 wherein the washing step includes washing the groups of rocks separately.

4. The method of claim 3 wherein the groups of rocks include larger and smaller sized groups of rocks.

5. The method of claim 4 wherein the washing step includes the step of spraying the larger sized group of rocks with the washing liquid and passing the dirty washing liquid through a multi-stage settling chamber to separate any sinking solid material.

6. The method of claim 3 wherein the washing step includes the step of tumbling the smaller sized group of rocks in the washing liquid.

7. The method of claim 1 wherein the washing step includes the steps of:
   separating the washed rock from the dirty liquid;
   removing any solid matter from the dirty liquid to get hydrocarbon-contaminated liquid and solid matter; and
   separating the hydrocarbon from the hydrocarbon-contaminated liquid to get the hydrocarbon and the washing liquid.

8. The method of claim 7 wherein washing step includes the steps of disposing of the hydrocarbon and reusing the washing liquid.

9. A method for decontaminating a soil mixture contaiminated with a hydrocarbon, the soil mixture including soil, rock and, optinally, extraneous material, comprising the following steps:
   checking the soil mixture for hazardous materials of the type which when incinerated at between 760° C. and 900° C. either do not break down or create other hazardous materials;
   accepting the soil mixture for treatment so long as the soil mixture is substantially free of said hazardous materials;
   storing the soil mixture at a fixed storage site;
   separating substantially all of the rock and extraneous material from the soil in the soil mixture;
   separating the rock from the extraneous material;
   washing the rock with a washing liquid.

10. The method of claim 9 further comprising the step of segregating the separated rock into groups of rocks according to size.

11. The method of claim 10 wherein the washing step includes washing the group of rocks separately.

12. The method of claim 10 wherein the-groups of rocks include larger and smaller sized groups of rocks.

13. The method of claim 12 wherein the washing step includes the step of spraying the larger sized group of rocks with the washing liquid and passing the dirty washing liquid through a multi-stage settling chamber to separate any sinking solid material.

14. The method of claim 11 wherein the washing step includes the step of tumbling the smaller sized group of rocks in the washing liquid.

15. The method of claim 9 wherein the washing step includes the steps of:
 separating the washed rock from the dirty liquid;
 removing any solid matter from the dirty liquid to get hydrocarbon-contaminated liquid and solid matter; and
 separating the hydrocarbon from the hydrocarbon-contaminated liquid to get the hydrocarbon and the washing liquid.

16. The method of claim 15 wherein washing step includes the steps of disposing of the hydrocarbon and reusing the washing liquid.

17. A method for decontaminating a soil mixture contaminated with a hydrocarbon, the soil mixture including soil, rock and, optionally, extraneous material, comprising the following steps:
 checking the soil mixture for hazardous materials of the type which when incinerated at between 760° C. and 900° C. either do not break down or create other hazardous materials;
 accepting the soil mixture for treatment so long as the soil mixture is substantially free of said hazardous materials;
 storing the soil mixture at a fixed storage site;
 separating substantially all of the rock and extraneous material from the soil in the soil mixture;
 separating the rock from the extraneous material;
 disposing of or recycling of extraneous material without further treatment.

* * * * *